United States Patent
Domeij (10) Patent No.: US 9,757,805 B2
(45) Date of Patent: Sep. 12, 2017

(54) DEVICE FOR CAPTURING, CENTRING, GRIPPING AND/OR SECURING OBJECTS

(71) Applicant: Pär Domeij, Luleå (SE)

(72) Inventor: Pär Domeij, Luleå (SE)

(*) Notice: Subject to any disclaimer, the term of this patent is extended or adjusted under 35 U.S.C. 154(b) by 0 days.

(21) Appl. No.: 14/893,231

(22) PCT Filed: May 28, 2014

(86) PCT No.: PCT/SE2014/000070
§ 371 (c)(1),
(2) Date: Nov. 23, 2015

(87) PCT Pub. No.: WO2014/193285
PCT Pub. Date: Dec. 4, 2014

(65) Prior Publication Data
US 2016/0089726 A1 Mar. 31, 2016

(30) Foreign Application Priority Data
May 30, 2013 (SE) ...................................... 1350662

(51) Int. Cl.
*B23B 31/117* (2006.01)
*B25B 5/14* (2006.01)
(Continued)

(52) U.S. Cl.
CPC ............ *B23B 31/117* (2013.01); *B25B 5/147* (2013.01); *B25B 9/00* (2013.01); *B25B 11/00* (2013.01);
(Continued)

(58) Field of Classification Search
CPC ... B23B 31/08; B23B 31/1175; B23B 31/117; B25B 11/00; B25B 9/00; B25B 5/147;
(Continued)

(56) References Cited

U.S. PATENT DOCUMENTS 842,177 A * 1/1907 Cushman .............. B23B 31/202
279/46.1
2,509,688 A * 5/1950 Loosli ..................... B23B 31/12
279/46.1
(Continued)

FOREIGN PATENT DOCUMENTS

DE 19709353 6/1998
KR 20070066776 A * 6/2007

*Primary Examiner* — Eric A Gates
*Assistant Examiner* — Chwen-Wei Su (57) ABSTRACT

A device (100) for capturing, centring, gripping and/or securing an object (140) is disclosed. The device comprises a hub (101) and a ring (102) which are concentric and arranged rotatably relative to each other. On the hub there is at least one first control point (111, 111', 111"), and on the ring there is at least one second control point (112, 112', 112"), which control points are arranged at different axial levels (151,152). At least one tensioning member (121,122, 123) is arranged to interact with the at least one first control point and with the at least one second control point during the rotation, such that the at least one tensioning member is stretched across the air gap (130) in the device. The different axial levels for the at least one first control point and the at least one second control point mean that the at least one tensioning member can freely pass over the at least one first control point during the rotation and can be stretched across the air gap towards the object. Substantially any desired angle of rotation between the hub and the ring can be obtained in this way.

3 Claims, 7 Drawing Sheets

(51) Int. Cl.
*B25B 9/00* (2006.01)
*B25J 15/00* (2006.01)
*B66C 1/42* (2006.01)
*B25B 11/00* (2006.01)
B23B 31/08 (2006.01)
B65G 47/90 (2006.01)

(52) U.S. Cl.
CPC .......... *B25J 15/00* (2013.01); *B66C 1/42* (2013.01); *B23B 31/08* (2013.01); *B23B 31/1175* (2013.01); *B23B 2226/33* (2013.01); *B23B 2270/06* (2013.01); *B65G 47/90* (2013.01); *Y10T 279/17411* (2015.01); *Y10T 279/17905* (2015.01); *Y10T 279/26* (2015.01)

(58) Field of Classification Search
CPC .......... Y10T 279/26; Y10T 279/17411; Y10T 279/17905
See application file for complete search history.

(56) References Cited

U.S. PATENT DOCUMENTS

3,294,427 A * 12/1966 Hunt .................. B25G 1/00
174/84 R
6,986,433 B2 * 1/2006 Colford ................ B65D 47/00
220/200

\* cited by examiner

DEVICE FOR CAPTURING, CENTRING, GRIPPING AND/OR SECURING OBJECTS

TECHNICAL FIELD

The present invention relates to a device for capturing an object and also relates to a method for capturing an object.

BACKGROUND

In a great many applications within different fields, there is a need to capture, centre, grip and/or secure an object. There are also many devices which are intended to secure objects, for example vices, clamps, various types of tools and chucks. However, some of these devices intended for securing purposes have problems relating to the fact that they risk damaging the object that is to be secured.

Another problem with the abovementioned securing devices is that they are not intended for stable securing of objects with certain cross sections, for example with irregular and/or asymmetrical cross sections. For example, a vice can safely secure an object with straight edges but offers poor securing of objects with sloping and/or irregular edges. Such objects also risk being damaged in a vice, for example, since the force from the vice is often concentrated on a small contact surface.

Swedish patent application 1100560-0 discloses a chuck for securing and centring elongate objects during rotary working, such as surface treatment, for example painting or lacquering. In 1100560-0, at least three tensioning members are tensioned between fastening devices on first and second parts of the chuck. The first and second parts can be rotated relative to each other, wherein the at least three tensioning members are stretched across the gap of the chuck by the rotation and are thus tensioned around an object located in the gap. In this way, objects with basically any cross-sectional shape can be centred and secured by the chuck.

However, the chuck disclosed in 1100560-0 poses a problem in that the opening of the gap is limited in its open position by the at least three tensioning members, as is shown in FIG. 2 of 1100560-0, which illustrates the open position of the chuck. The chuck disclosed in 1100560-0 also has a problem in that the rotation of the first and second parts relative to each other is limited. The fastening devices on the first and second parts mean that the maximum rotation can be 360°/number of tensioning members. For three tensioning members, for example, the angle of rotation is thus limited to a maximum of 120°, which is illustrated in FIG. 4 of 1100560-0. In this way, the securing force for the chuck is also limited.

BRIEF DESCRIPTION OF THE INVENTION

It is therefore an aim of the present invention to make available a device and a method for capturing an object, which device and method at least partially solve the abovementioned problems of the prior art.

This aim is achieved by the above mentioned device and method according to the characterizing of the invention as claimed.

According to the present invention, a device for capturing, centring, gripping and/or securing an object is provided.

The device comprises a hub and a ring, which are concentric and arranged rotatably relative to each other. The hub and/or the ring can thus be rotated about the axis of rotation. On the hub there is at least one first control point, and on the ring there is at least one second control point, which control points are arranged at different axial levels. At least one tensioning member is arranged to interact with the at least one first control point and with the at least one second control point, respectively, during the rotation of the ring relative to the hub, such that the at least one tensioning member is stretched across the air gap in the device and towards the object that is to be captured/centred/gripped/secured. The different axial levels for the at least one first control point and the at least one second control point, respectively, mean that the at least one tensioning member can freely pass over the at least one first control point during the rotation and can be stretched across the air gap towards the object. In this way, substantially any desired/arbitrary angle of rotation between the hub and the ring can be obtained.

The substantially free angle of rotation means that very reliable capturing, centring, gripping and/or securing is provided by the present invention. For example, the angle of rotation between the hub and the ring can be up to 180°, or even 360°, whereby firm securing of the object can be achieved.

By means of the design of the device according to the present invention, its entire air gap is open and accessible for insertion of the object, as a result of which it is possible for objects with relatively large cross-sectional areas to be inserted into the device.

According to one embodiment of the present invention where sections of the hub or ring lying between the control points are removed/open/provided with recesses, the object can also be inserted into the air gap via these removed/open/recessed sections between the control points, that is to say radially into the air gap. This can be achieved by the hub and the ring being designed as claw-shaped fingers, in which case the object can also be inserted into the air gap between these fingers, which further facilitates the insertion.

According to one embodiment of the present invention, the device is provided with at least one tensioning device, which is designed to tension a tensioning member. When these one or more tensioning devices are used, their tensioning force can be controlled such that the device provides a substantially constant pressure against the object when the ring is rotated relative to the hub. This is very advantageous for capturing, centring, gripping and/or securing fragile objects, since the pressure against the object can then be adapted according to the sensitivity of the object.

BRIEF DESCRIPTION OF THE FIGURES

The invention is explained in more detail below with reference to the attached drawings, in which identical reference signs are used for identical parts, and where.

DESCRIPTION OF PREFERRED EMBODIMENTS

FIGS. 1a-g show an example of a device 100 according to one aspect of the present invention at different degrees of opening of the device. The device 100 comprises a hub 101 and a ring 102, which are arranged concentrically, with the ring 102 outside the hub 101. On the hub 101 there is at least one first control point 111, 111', 111". On the ring 102 there is at least one second control point 112, 112', 112".

Figures 1A, 1B:
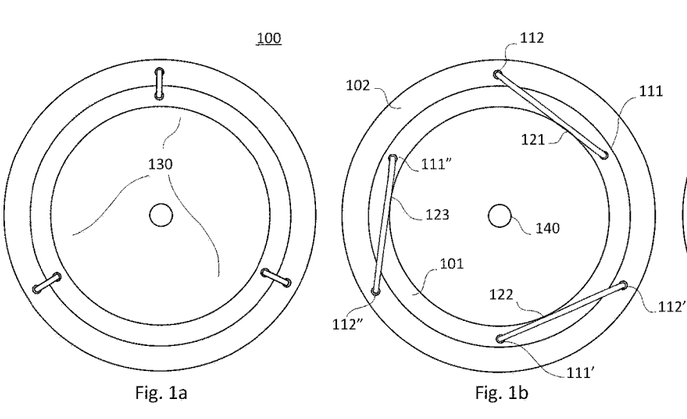
FIGS. 1a-g show an embodiment of the device according to the present invention.
Figure 1C:
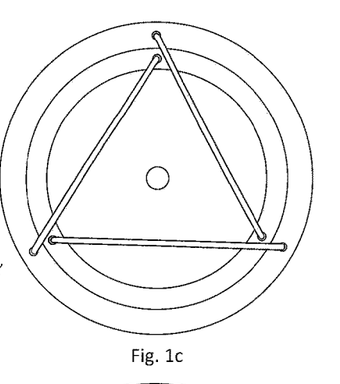

The hub 101 and the ring 102 together form an air gap 130. An object can be inserted into this air gap 130. FIG. 1*a* shows the device 100 in a completely open position, that is to say with a 0° angle of rotation between hub 101 and ring 102, wherein the entire air gap 130 is free for insertion of the object 140. FIGS. 1*b-f* show different degrees of closure of the device 100, which are described below.

According to the present invention, the at least one first control point 111, 111', 111" is arranged at a first axial distance 151 from an axial reference point 150 while the at least one second control point 112, 112', 112" is arranged at a second axial distance 152 from the axial reference point 150, where the first axial distance 151 and the second axial distance 152 are different. In other words, the at least one first control point 111, 111', 111" and the at least one second control point 112, 112', 112" are arranged at different axial levels, as is shown in FIG. 1*g*.

The axial reference point 150 in FIG. 1*g*, and in FIG. 3*a* below, is illustrated as being placed at a bottom of the air gap 130. However, this reference point 150 can be placed more or less anywhere in the axial direction of the device 100. The axial reference point 150 is used here to define the first 151 and second 152 distances as of different length, that is to say to define the different axial levels of the at least one first control point 111, 111', 111" and the at least one second control point 112, 112', 112", respectively. For example, the reference point 150 could also be placed axially at the at least one second control point 112, 112', 112", wherein the second axial distance 152 is zero, and the first axial distance 151 is greater than zero; 151>0. In a corresponding manner, the reference point 150 could also be placed axially at the at least one first control point 111, 111', 111", wherein the first axial distance 151 is zero, and the second axial distance 152 is greater than zero; 152>0. In FIG. 1*g*, the difference between the first distance 151 and second distance 152 is designated as $\Delta_{151\text{-}152}$. According to the present invention, this difference is therefore greater than zero, $\Delta_{151\text{-}152}>0$.

The device 100 also comprises at least one tensioning member 121, 122, 123, illustrated in FIGS. 1*a-g* with three tensioning members 121, 122, 123. The at least one tensioning member 121, 122, 123 is arranged to interact with the at least one first control point 111, 111', 111", respectively, and with the at least one second control point 112, 112', 112", respectively. According to one embodiment, the at least one tensioning member 121, 122, 123 can be bendable and can be rotated around the object 140 when the hub 101 and the ring 102 are rotated relative to each other, as is illustrated in FIGS. 1*a-f*.

According to one embodiment of the invention, the at least one tensioning member 121, 122, 123 is elastic and is fixed on at least one of said at least one first control point 111, 111', 111", respectively, and said at least one second control point 112, 112', 112", respectively. For example, the elastic at least one tensioning member can be a rubber band.

The concentrically arranged hub 101 and ring 102 can be rotated concentrically relative to each other, which means that the at least one tensioning member 121, 122, 123 is stretched across the air gap 130. The different first axial distance 151 and second axial distance 152 of the at least one first control point 111, 111', 111" and the at least one second control point 112, 112', 112", respectively, have the effect that the at least one tensioning member 121, 122, 123 passes over the at least one first control point 111, 111', 111" and can be stretched across the air gap 130 towards the object 140. The stretching of the at least one tensioning member 121, 122, 123 across the air gap is shown to different degrees in FIGS. 1*b-f*.

Figure 1D:
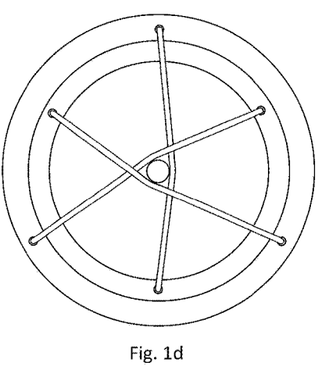

When the rotation of the ring 102 relative to the hub 101 continues, for example to 180°, the object is captured, as is shown in FIG. 1*d*.

Figure 1E:
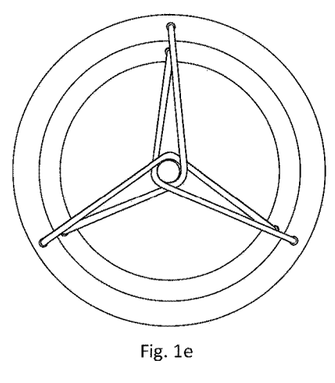

Upon continued rotation of the ring 102 relative to the hub 101, the captured object 140 is centred by the device 100, as is shown in FIGS. 1*d-e* for the rotation angles 180° and 240° respectively. At least two tensioning members 121, 122, 123 are needed for centring the object.

Figure 1F:
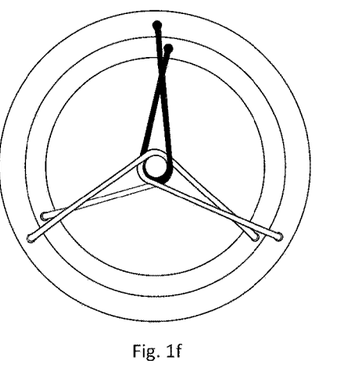
Figure 1G:
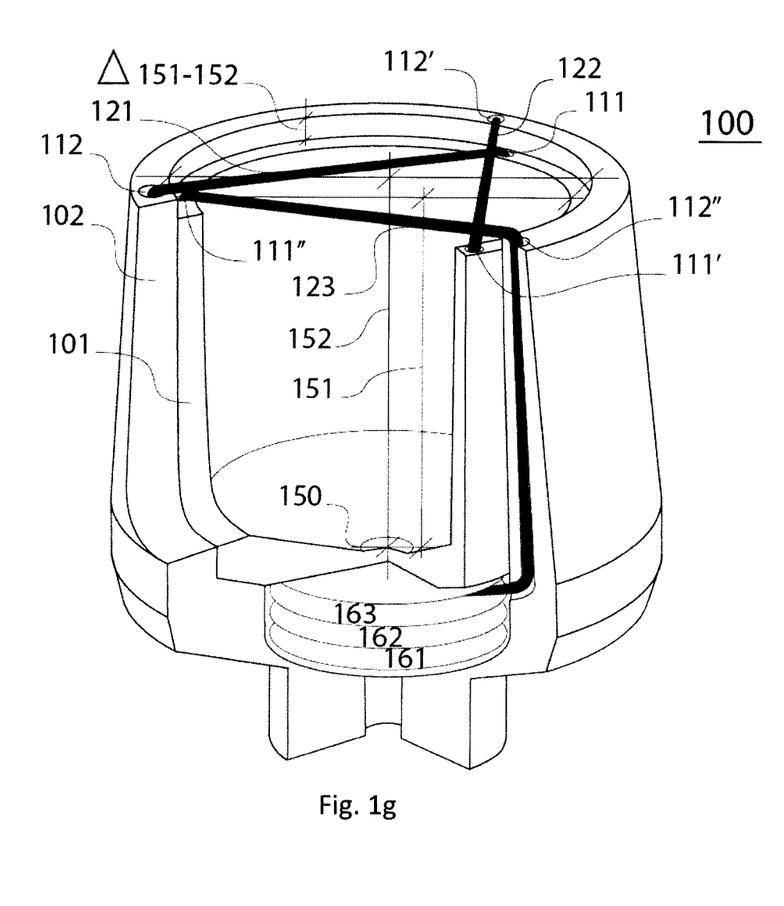

Upon continued rotation of the ring 102 relative to the hub 101, the captured object 140 is gripped by the device 100. This is shown in FIGS. 1*e-f* for the rotation angles 240° and >360° respectively. These large rotation angles had not been possible to obtain with the chuck shown in Swedish patent application 1100560-0, since the fastening devices in this chuck make it impossible to obtain rotation angles in excess of 120° when the tensioning members are impeded in rotation by the fastening devices.

However, by virtue of the different axial levels for the first and second control points according to the present invention, it is possible to obtain any desired/arbitrary angles of rotation, including ones in excess of 120°, resulting in very stable centring, gripping and securing.

When the object 140 has been gripped by the device 100, the latter can secure the object 140 as shown in FIGS. 1*e-f*. The object can easily be released again by turning the ring 102 back relative to the hub 101.

The device 100 according to the present invention can capture, centre, grip and/or secure objects of any cross section. Since the at least one tensioning member 121, 122, 123 comes up against the surface of the object and then rotates about this surface upon further rotation of the ring relative to the hub, the surface of the object can have any shape, for example right angles or oblique angles, or can be at least partially rounded, or can have a regular or irregular shape, or can be symmetrical or asymmetrical. The only limitation on the cross section of the object is that it must find room in the air gap 130 during use of the present invention.

As can be seen from FIG. 1*a*, the entire air gap 130 is accessible for insertion of the object in the fully open position of the device 100 (with 0° angle of rotation). In this way, larger objects can be inserted into the device 100 according to the present invention than was possible for example in Swedish patent application 1100560-0, for the same diameter of hub and ring.

As can be seen from FIGS. 1*a-f*, the ring 102 can be rotated through a large angle of rotation relative to the hub 101. In other words, the ring 102 and/or the hub 101 are rotatable about the rotation axis 170, such that the ring 102 and the hub 101 are rotated relative to each other. FIG. 1*f* shows an angle of rotation of 360°, but even greater angles of rotation are possible with the device according to the present invention. The possibility of using this large angle of rotation is achieved, according to the present invention, by arranging the at least one first control point 111, 111', 111" at an axial level other than the one where the at least one second control point 112, 112', 112" is arranged, that is to say by using the different first axial distance 151 and second axial distance 152 relative to the axial reference point 150. In this way, the at least one tensioning member 121, 122, 123 can pass across the at least one first control point 111, 111', 111" and can be rotated about the object 140.

At the angle of rotation 360°, which is illustrated in FIG. 1f, the at least one tensioning member 121, 122, 123 is guided around the object 140 and back in the direction of its starting point. Here, at least one first control point 111, 111', 111" thus lies near at least one second control point 112, 112', 112", respectively. In this way, the object is reliably secured with great force, which great force exceeds the force that can be obtained, for example, with the chuck described in Swedish patent application 1100560-0.

At even greater angles of rotation, the at least one tensioning member 121, 122, 123 is wound even more around the object 140, for example by a full turn, which provides for very stable securing of the object 140. According to one embodiment of the present invention, the angle of rotation between the hub 101 and the ring 102 can be substantially any desired angle. Thus, the rotation can be continued here until a sufficient securing force is obtained.

As is illustrated in FIGS. 1a-g, and also in FIGS. 2a-e and 3a-h below, the at least two first control points 111, 111', 111" can be distributed substantially uniformly about the hub 101. Correspondingly, the at least two second control points 112, 112', 112" can be distributed substantially uniformly about the ring 102. In this way, an effective centring of the object 140 and a uniformly distributed force against the object 140 can be achieved.

The angle of rotation of the hub 101 and the ring 102 relative to each other is small in a first open position, in which the object 140 can be inserted into the air gap 130. This first position is shown in FIGS. 1a-b, 2a-b and 3a-b. In a second position, the angle of rotation is of any desired size, with the object 140 being able to be captured/centred/gripped/secured by the device 100. This second position is shown in FIGS. 1c-f, 2c-e and 3c-h.

A great advantage of the present invention is that it is possible to capture/centre/grip/secure objects that have a regular or irregular cross section which is either symmetrical or asymmetrical compared to the air gap 130.

According to one embodiment of the present invention, the device 100 for capturing, centring, gripping and/or securing an object 140 comprises at least one tensioning device 161, 162, 163, which is arranged to stretch one of the at least one tensioning members 121, 122, 123. Thus, each one of the at least one tensioning members 121, 122, 123 can here be tensioned respectively by at least one tensioning device 161, 162, 163. An example of such a device 100, with a side partially cut away, is shown in FIG. 1g. Here, the tensioning device 161, 162, 163 thus creates a force which tensions respective tensioning members 121, 122, 123, so as to permit capturing, centring, gripping and/or securing. The tensioning device 161, 162, 163 can be in the form of substantially any unit that is able to create a tensioning force that can be applied to the tensioning member 121, 122, 123, for example a motor, a spring, an elastomer, a hydraulic tensioning device and/or a pneumatic tensioning device.

When the device 100 according to this embodiment of the invention comprises at least one tensioning device 161, 162, 163, the at least one tensioning member 121, 122, 123 can be substantially non-elastic and can run through one or more of the at least one first control point 111, 111', 111", respectively, and the at least one second control point 112, 112', 112", respectively. Here, the tensioning member 121, 122, 123 can thus be fixed at one end in one of the first 111, 111', 111" and second 112, 112', 112" control points, while the other end is coupled to the tensioning device 161, 162, 163, which supplies a tensioning force to the tensioning member 121, 122, 123.

According to one embodiment, the at least one tensioning device 161, 162, 163 is designed to provide a selectable force against the object 140 when the hub 101 and the ring are rotated relative to each other. This selectable force can, for example, be constant during the rotation, in which case the tensioning device 161, 162, 163 successively reduces the applied force as the rotation proceeds. Variable forces against the object 140 can also be created in a corresponding manner by controlling the force provided by the tensioning device. This may be very advantageous when the object is fragile in some respect.

According to one embodiment of the present invention, the device 100 comprises at least two tensioning members 121, 122, 123 and at least two tensioning devices 161, 162, 163, where the at least two tensioning devices 161, 162, 163 are movable in relation to the object 140. During the movement of the at least two tensioning devices 161, 162, 163, the secured object 140 is also moved radially within the air gap 130. If the movements of the tensioning devices 161, 162, 163 are coordinated/synchronized, a secured object 140 can thus be repositioned radially within the air gap, for example on a workbench or the like. This radial movement can also be used when two objects are to be oriented towards each other, for example when welding two pipes together, in which case at least one of the objects can be secured and positioned with respect to the second object in this manner.

Figures 2A, 2B, 2C, 2D, 2E:
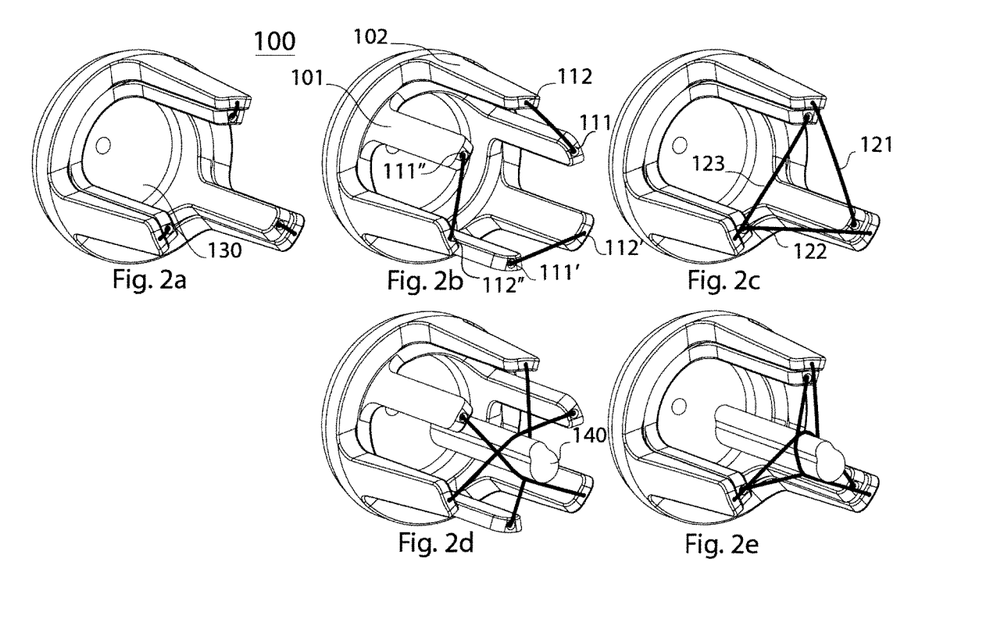
FIGS. 2a-e show an embodiment of the device according to the present invention.

FIGS. 2a-e and 3a-h show an embodiment of the present invention for which the hub 101 has the shape of a claw comprising at least two fingers, illustrated in FIGS. 2a-e and 3a-h with three fingers having recesses/openings between them. Each one of the at least two fingers comprises a first control point 111, 111', 111" which is arranged at the first axial distance 151 from the axial reference point 150. Correspondingly, the ring 102 also has the shape of a claw comprising at least two fingers, illustrated in FIGS. 2a-e and 3a-h having three fingers with recesses between them, where each one of the at least two fingers has a second control point 112, 112', 112", which is arranged at the second axial distance 152 from the axial reference point 150. In the fully open position of the device, as shown in FIGS. 2a and 3b, the object 140 can be inserted into the air gap 130 of the device both axially and radially. Thus, the object 140 can also be inserted radially between the fingers 101, 102 of the claw, which facilitates the insertion for some shapes of the object 140.

Figures 3A, 3B, 3C:
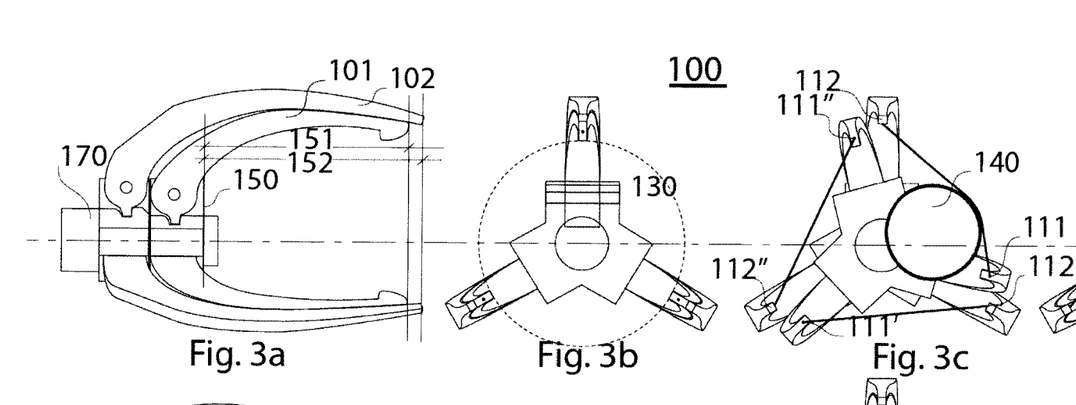
FIGS. 3a-h show an embodiment of the device according to the present invention.
Figure 3D:
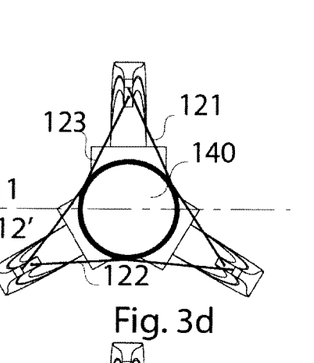

FIGS. 2d and 3c-d show how the object 140 is captured (FIG. 3c) when the hub 101 and the ring 102 are rotated relative to each other and is then centered (FIGS. 2d and 3d) when the rotation continues.

The at least two fingers 101, 102 of the device can also be articulated and can thus be angled away from and towards a rotation axis 170 of the device. In this way, the at least two fingers 101, 102 of the device can be angled in towards the object 140 when the rotation continues, as is shown in FIG. 3e.

Figures 3E, 3F, 3G:
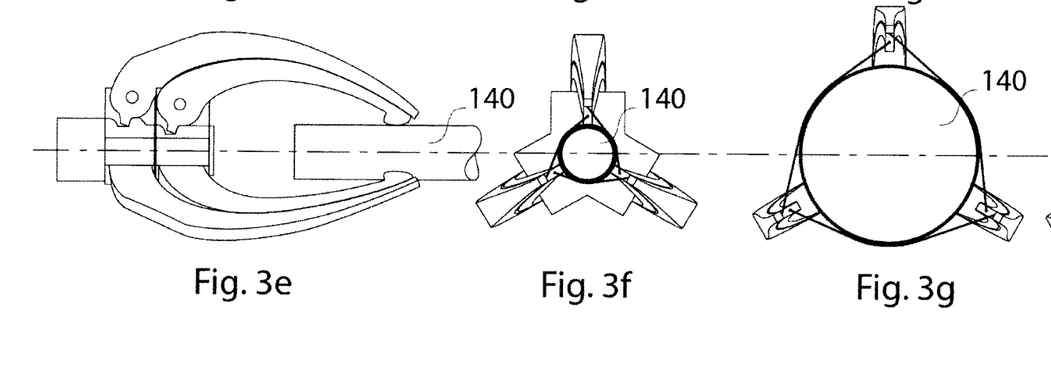
Figure 3H:
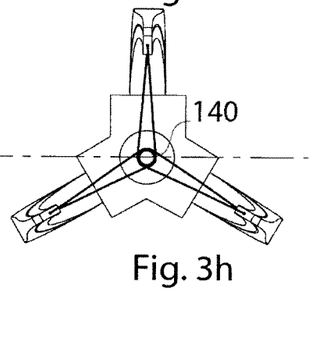

FIGS. 3f-h show centring/gripping/securing of objects with different diameters, which are possible with this embodiment of the present invention. FIG. 3h shows a rotation of 360° between hub and ring, which provides very strong securing of the object 140.

For the embodiment shown in FIGS. 2a-e and 3a-h, it is possible, for example, to advantageously use the above-described embodiment with tensioning devices and non-elastic tensioning members 121, 122, 123. However, elastic tensioning members 121, 122, 123, such as rubber bands, can also be used for this embodiment.

According to one embodiment of the present invention, the device 100 according to the invention comprises a locking device with which the hub 101 and the ring 102 can be mutually fixed at a locking angle relative to each other. In this way, a strong, stable and reliable securing of the object is achieved. The locking device can comprise an electric motor, a hydraulic locking member and/or a pneumatic locking member.

According to one embodiment of the present invention, the at least one tensioning member 121, 122, 123 is stiff and runs through at least one of the first control points 111, 111', 111" and the second control points 112, 112', 112". The at least one tensioning member 121, 122, 123 is here arranged to be pressed against the object 140 when the hub 101 and the ring 102 are rotated relative to each other. In this way, a force directed towards the object 140 is created, which grips/centres/secures the object. Here, the rotation is limited by the stiffness of the tensioning member, for which reason the hub 101 and the ring 102 are rotatable relative to each other with a limited angle of rotation. Since the first control points 111, 111', 111" and the second control points 112, 112', 112" are arranged at different axial levels, they do not effect any limitation of the rotation. Instead, the rotation is limited by the stiffness of the at least one tensioning member 121, 122, 123. By using a stiff tensioning member, less fragile objects 140 can advantageously be gripped/centred/secured.

According to one embodiment of the present invention, a difference $\Delta_{151-152}$ between the first axial distance 151 and the second axial distance 152 is related to a total diameter ø for the at least one tensioning member 121, 122, 123. In this way, it can be ensured that the at least one tensioning member 121, 122, 123 safely passes the at least one first control point 111, 111', 111" when it is stretched across the air gap 130. This therefore permits a substantially free rotation of the ring relative to the hub and, therefore, a stable securing of the object. For a solid tensioning member, for example a cord or a rubber band, the total diameter ø constitutes the diameter of the tensioning member, and, for other tensioning members, for example a chain or cable, it constitutes a diameter of a surface which is taken up when the at least one tensioning member is rotated about its axis.

According to one embodiment, the difference $\Delta_{151-152}$ between the first axial distance 151 and the second axial distance 152 has a magnitude within the range 1*ø-4*ø, and preferably within the range 2*ø-3*ø, in relation to the total diameter ø for the at least one tensioning member 121, 122, 123. The at least one tensioning member 121, 122, 123 can then easily pass the at least one control point 111, 111', 111" when it is stretched across the air gap 130, thereby permitting substantially any desired angle of rotation between hub and ring.

According to one embodiment of the present invention, the device 100 comprises several sets/layers of tensioning members and corresponding first and second control points, where these different layers are arranged at different axial levels, that is to say at different distances from the axial reference point 150. Each one of these several layers is thus provided with at least one tensioning member 121, 122, 123, at least one first control point 111, 111', 111", and at least one second control point 112, 112', 112". When the device is equipped with several layers according to this embodiment, it is not only the radial direction but also the axial direction of the object that is determined by the device 100.

According to one aspect of the present invention, a method is made available for capturing/centring/gripping/securing an object by means of the above-described device 100. This method is illustrated by the flow chart in FIG. 4.

Figure 4:
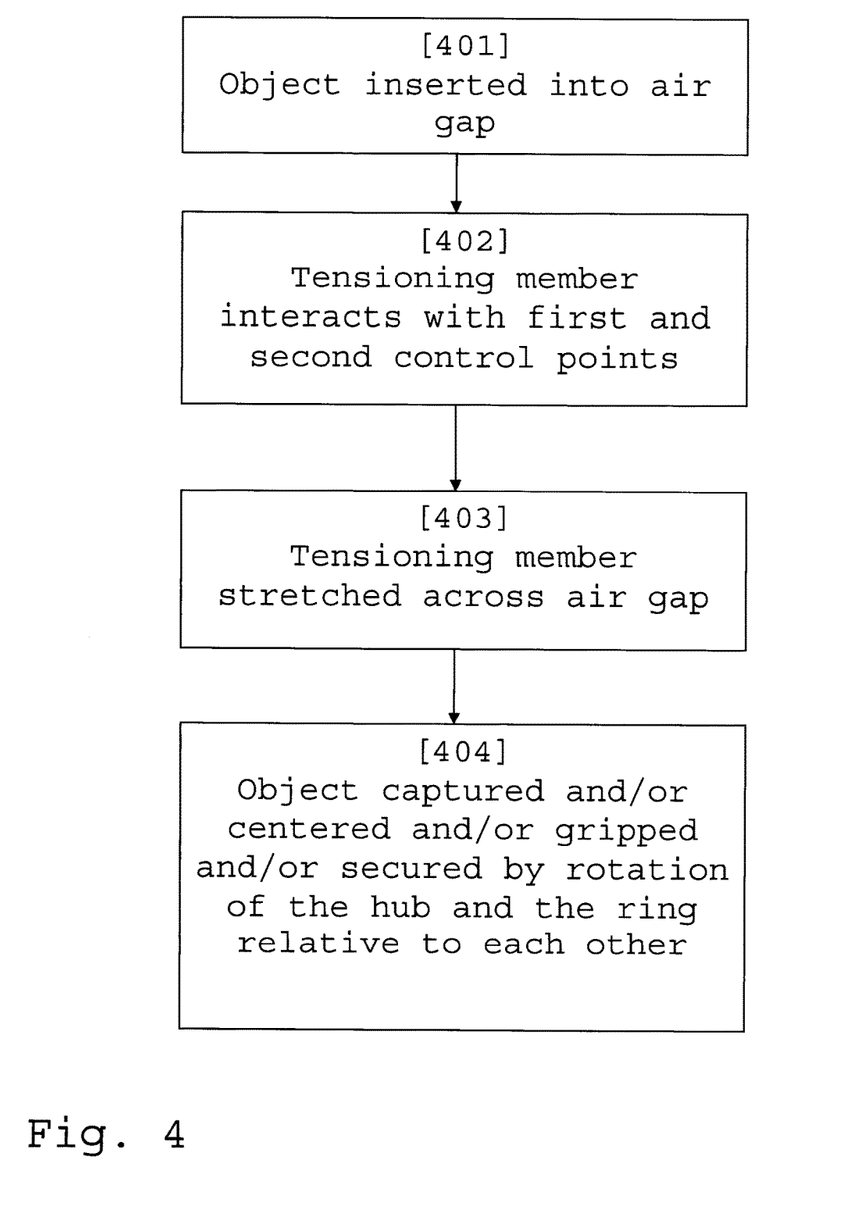
FIG. 4 shows a flow chart of the method according to the present invention.

In a first step 401 of the method, the object 140 is inserted into the air gap 130.

In a second step 402, the at least one tensioning member 121, 122, 123 interacts with said at least one first control point 111, 111', 111", respectively, and with said at least one second control point 112, 112', 112", respectively.

In a third step 403, the at least one tensioning member 121, 122, 123 is stretched across the air gap 130 when the hub 101 and the ring 102 are rotated relative to each other. As has been described above, the at least one tensioning member 121, 122, 123 is stretched from the at least one first control point 111, 111', 111", respectively, arranged at a first axial distance 151 from an axial reference point 150, to the at least one second control point 112, 112', 112", respectively, arranged at a second axial distance 152 from the axial reference point 150. The first 151 and second 152 axial distances are different from each other, which means that the at least one tensioning member 121, 122, 123 can freely pass the at least one first control point 111, 111', 111" when it is stretched across the air gap 130.

In a fourth step 404, the object is captured by the device 100 through concentric rotation of the hub 101 and the ring 102 relative to each other, that is to say by rotation of the hub 101 and/or the ring 102. By means of further rotation, the object is centred, gripped and/or secured by the device 100.

The device according to the present invention, as described above and in the patent claims, can be used in a large number of fields for capturing, centring, gripping and/or securing different types of objects.

The objects can consist of living or dead matter and can have a regular, irregular, symmetrical or asymmetrical cross section. The objects can also have substantially any desired length.

A number of examples of objects that can be captured, centred, gripped and/or secured by the device 100 are listed below, likewise a number of examples of the fields of use of the device 100. These are merely examples and should not be regarded as limiting the use of the present invention.

Some non-limiting examples of objects that can be caught, centred, gripped and/or secured by the device 100 according to the invention are:
a fishing rod;
a beverage container;
a microphone;
a prosthesis;
a person;
an exhaust pipe;
a Christmas tree/any type of tree;
at least one pipe/rod;
a raw material;
a foodstuff;
a semi-finished product; and
a fish.

Some non-limiting examples of the use of the device 100 according to the present invention are:
 capturing and/or centring and/or gripping and/or securing during painting, lacquering and/or gluing of an object;
 capturing and/or centring and/or gripping and/or securing of a beverage container;
 capturing and/or centring and/or gripping and/or securing of a microphone;
 capturing and/or centring and/or gripping and/or securing of a prosthesis;
 capturing and/or centring and/or gripping and/or securing of a person during life-saving;
 capturing and/or centring and/or gripping and/or securing of a person during examination;

capturing and/or centring and/or gripping and/or securing of an exhaust pipe;

capturing and/or centring and/or gripping and/or securing of a Christmas tree;

capturing and/or centring and/or gripping and/or securing of at least one pipe/rod;

capturing and/or centring and/or gripping and/or securing of said objects during machining, such as grinding, milling, hacking, engraving, cutting, crosscutting and/or drilling of said objects;

capturing and/or centring and/or gripping and/or securing of a foodstuff;

capturing and/or centring and/or gripping and/or securing of a fish.

Figure 5A:
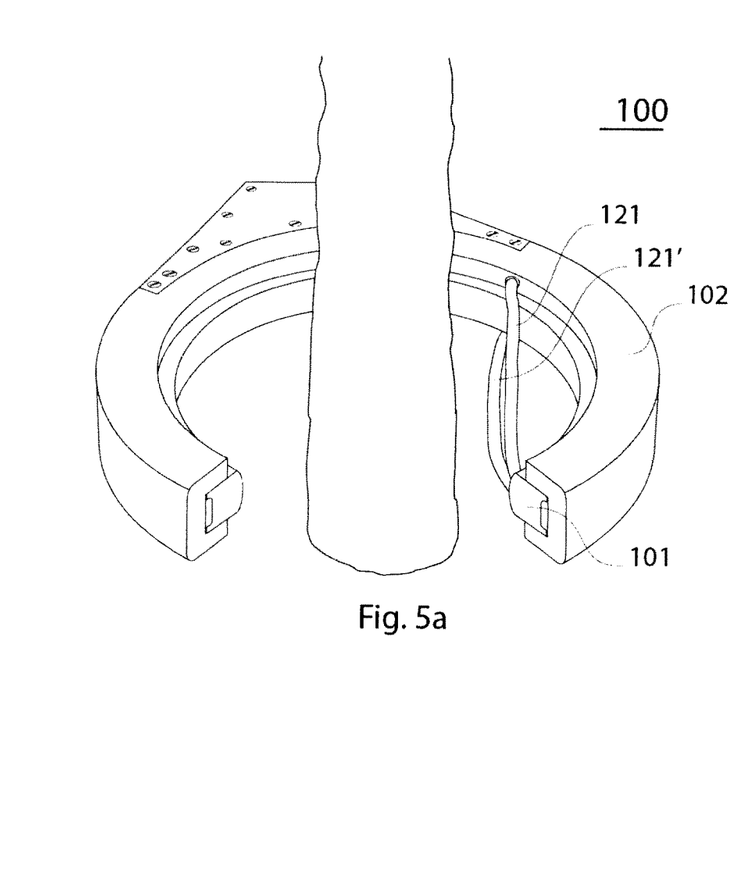
FIGS. 5a-d show a non-limiting example of the use of the device according to one embodiment of the present invention.
Figure 5B:
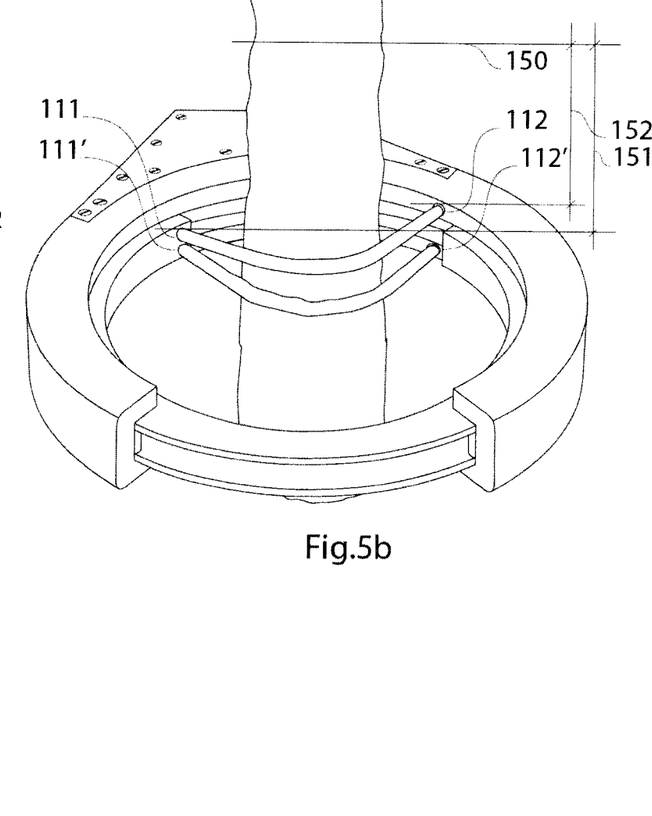

FIGS. 5a-b show a non-limiting example of a device 100 according to the present invention comprising a hub 101 with two first control points 111, 111' and a ring 102 with two second control points 112, 112', and also two tensioning members 121, 121' arranged in two layers. The first control points 111, 111' and the second control points 112, 112' are arranged at different axial levels in relation to the axial reference point 150, which are shown in the figure by 151, 152 for one tensioning member 121. In the example in FIGS. 5a-b, the object 140 can be, for example, a log of wood, and the device 100 can be a gripping claw, for example of a timber truck/forestry machine. However, a person skilled in the art will appreciate that the principle of the device shown in FIGS. 5a-b can also be used for tensioning solid objects, for example tools, flexible cables, plastic pipes or the like, inside a container composed of the hub 101 and the ring 102. The principle shown in FIGS. 5a-b can also be used when only one tensioning member is included in the device 100.

Figure 5C:
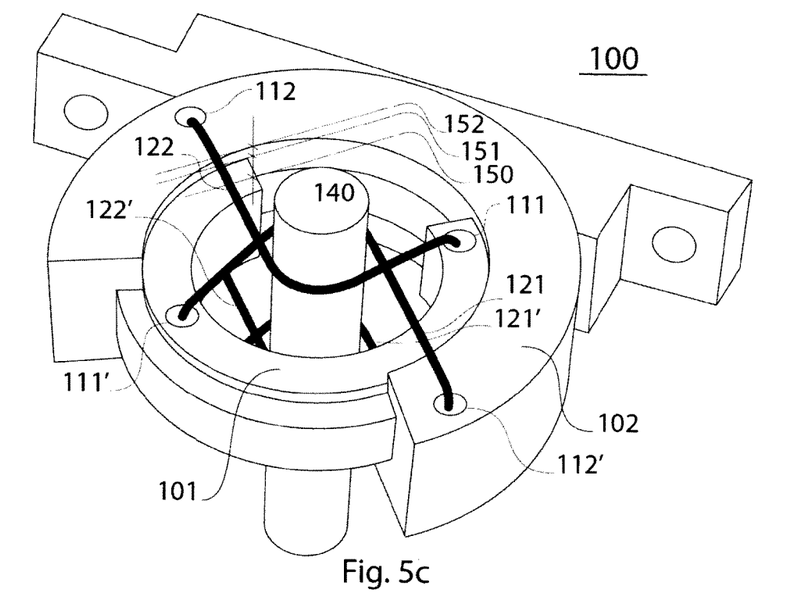

FIG. 5c shows a non-limiting example of a device 100 according to the present invention comprising a hub 101 with two first control points 111, 111' and a ring 102 with two second control points 112, 112', and also four tensioning members 121, 121', 122, 122' arranged in two layers with two tensioning members in each layer. The first control points 111, 111' and the second control points 112, 112' are arranged at different axial levels in relation to the axial reference point 150, which are shown in the figure by 151, 152 for the tensioning members 121, 122 of one layer. In the example in FIG. 5c, the object 140 can be, for example, a microphone, and the device 100 can be a microphone holder. However, a person skilled in the art will appreciate that the principle of the device shown in FIG. 5c can also be used for substantially any types of objects. The principle shown in FIG. 5c can also be used when only one layer of tensioning members is included in the device 100.

Figure 5D:
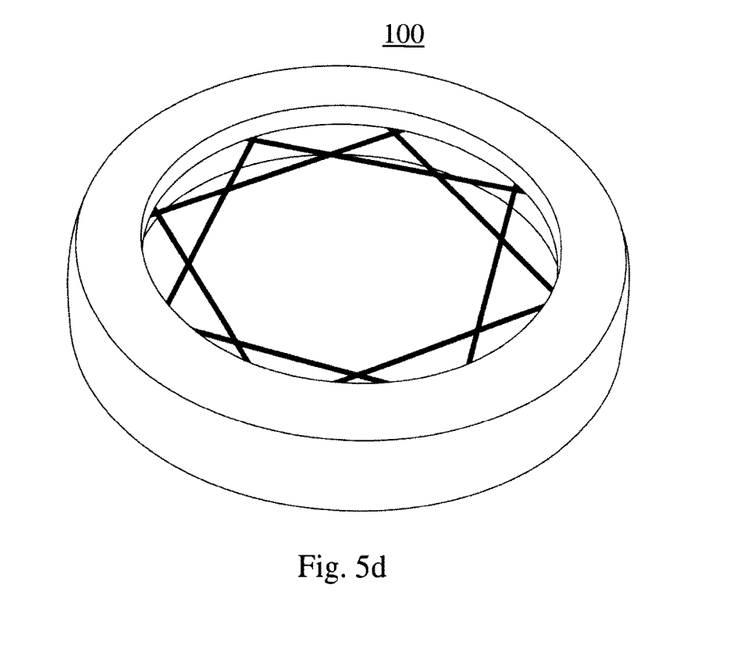

FIG. 5d shows a non-limiting example of a device 100 according to the present invention, where the device can, for example, be a mug holder, in which the object is a mug. However, a person skilled in the art will appreciate that other objects can also be secured by this device and that the number of tensioning members can be varied.

The present invention is not limited to the above-described embodiments of the invention and instead also relates to and covers all embodiments within the scope of the attached independent claims.

The invention claimed is:

1. A device for capturing an object, said device comprising:
   a hub, which comprises at least one first control point;
   a ring, which comprises at least one second control point and is arranged concentrically with said hub;
   an air gap formed by said hub and said ring in which air gap said object can be inserted;
   characterized in that:
   said at least one first control point is arranged at a first axial distance from an axial reference point and said at least one second control point is arranged at a second axial distance from said axial reference point, where said first axial distance and said second axial distance are different;
   at least one tensioning member is arranged to interact with said at least one first control point, respectively, and with said at least one second control point, respectively; and
   said hub and said ring are arranged rotatably relative to each other, said different first and second axial distances having the effect that said at least one tensioning member is arranged such that, when said hub and said ring are rotated relative to each other, it can pass said at least one first control point and is stretched across said air gap towards said object, as a result of which said object is captured;
   and wherein said at least one tensioning member is bendable, wherein said at least one tensioning member is arranged to be rotated around said object when said hub and said ring are rotated relative to each other;
   and wherein said device further comprises at least one tensioning device, which is arranged to stretch one of said at least one tensioning member;
   and wherein said at least one tensioning device is arranged to provide a selectable force against said object when said hub and said ring are rotated relative to each other;
   and wherein said selectable force is kept substantially constant when said hub and said ring are rotated relative to each other.

2. A device for capturing an object, said device comprising:
   a hub, which comprises at least one first control point;
   a ring, which comprises at least one second control point and is arranged concentrically with said hub;
   an air gap formed by said hub and said ring in which air gap said object can be inserted;
   characterized in that:
   said at least one first control point is arranged at a first axial distance from an axial reference point and said at least one second control point is arranged at a second axial distance from said axial reference point, where said first axial distance and said second axial distance are different;
   at least one tensioning member is arranged to interact with said at least one first control point, respectively, and with said at least one second control point, respectively; and
   said hub and said ring are arranged rotatably relative to each other, said different first and second axial distances having the effect that said at least one tensioning member is arranged such that, when said hub and said ring are rotated relative to each other, it can pass said at least one first control point and is stretched across said air gap towards said object, as a result of which said object is captured;
   and wherein said at least one tensioning member is bendable, wherein said at least one tensioning member is arranged to be rotated around said object when said hub and said ring are rotated relative to each other;
   and wherein said device further comprises at least one tensioning device, which is arranged to stretch one of said at least one tensioning member;

and wherein said device comprises at least two tensioning members and at least two tensioning devices, and wherein said at least two tensioning devices are movable in relation to said object wherein said secured object is moved radially within said air gap by the movement of said at least two tensioning devices.

3. A device for capturing an object, said device comprising:
- a hub, which comprises at least one first control point;
- a ring, which comprises at least one second control point and is arranged concentrically with said hub;
- an air gap formed by said hub and said ring in which air gap said object can be inserted;

characterized in that:
- said at least one first control point is arranged at a first axial distance from an axial reference point and said at least one second control point is arranged at a second axial distance from said axial reference point, where said first axial distance and said second axial distance are different;
- at least one tensioning member is arranged to interact with said at least one first control point, respectively, and with said at least one second control point, respectively; and
- said hub and said ring are arranged rotatably relative to each other, said different first and second axial distances having the effect that said at least one tensioning member is arranged such that, when said hub and said ring are rotated relative to each other, it can pass said at least one first control point and is stretched across said air gap towards said object, as a result of which said object is captured;
- and wherein said hub has the shape of a claw comprising at least two fingers with recesses between them, where each one of said at least two fingers comprises a first control point arranged at said first axial distance from said axial reference point; and
- said ring has the shape of a claw comprising at least two fingers with recesses between them, where each one of said at least two fingers comprises a second control point arranged at said second axial distance from said axial reference point;
- and wherein each one of said at least two fingers is articulated and can be angled away from and towards a rotation axis of said device.

\* \* \* \* \*